United States Patent [19]
Wodrich

[11] 3,917,953
[45] Nov. 4, 1975

[54] METHOD FOR DECREASING RADIATION HAZARD IN TRANSPORTING RADIOACTIVE MATERIAL

[75] Inventor: Donald D. Wodrich, Kennewick, Wash.

[73] Assignee: Atlantic Richfield Company, Los Angeles, Calif.

[22] Filed: Apr. 3, 1974

[21] Appl. No.: 457,531

[52] U.S. Cl. ............................ 250/506; 250/518
[51] Int. Cl. .......................................... G21c 19/20
[58] Field of Search......... 252/301.1 W; 176/28, 29, 176/30; 250/506, 507, 518, 515

[56] References Cited
UNITED STATES PATENTS
3,046,403  7/1962  Montgomery...................... 250/507

*Primary Examiner*—Harold A. Dixon
*Attorney, Agent, or Firm*—John R. Ewbank

[57] ABSTRACT

At the end of their useful life, fuel rods are removed from a nuclear reactor and transferred underwater into a shipping cask. The water in the pool of the nuclear reactor system (or fuels reprocessing plant) may contain troublesome amounts of radioactive isotopes, creating biological hazards for any shipping cask unless adequately cleaned after contacting pool water. Potential contamination of substantially all of the entire exterior of the shipping cask is avoided because such shipping cask is at least predominantly immersed in fresh water within a vertically shiftable container which can be, for example, shifted between the bottom and the surface of the pool. Fresh water is supplied to the interior of the shiftable container whereby substantially all of the exterior of the shipping cask is immersed in fresh water, maintained at a pressure and/or flow velocity preventing the pool water from contacting the exterior of the shipping cask.

9 Claims, 9 Drawing Figures

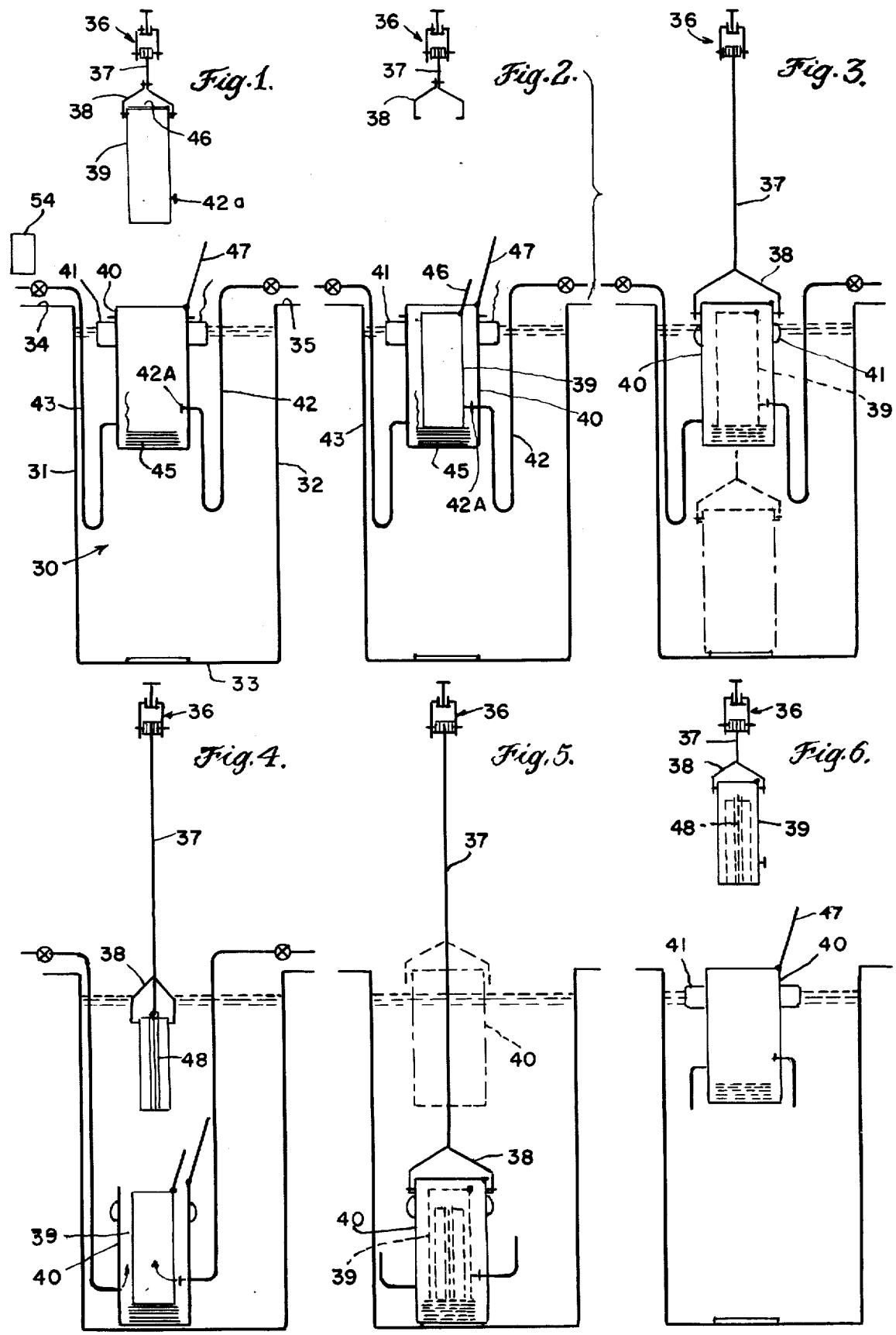

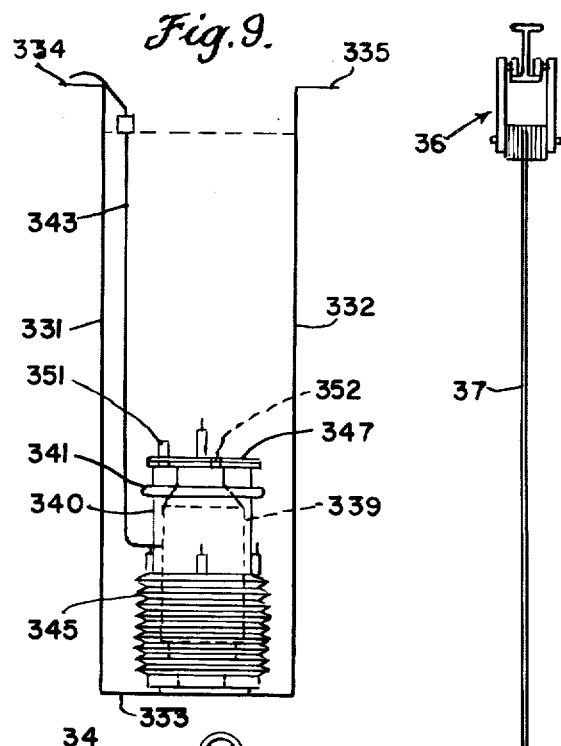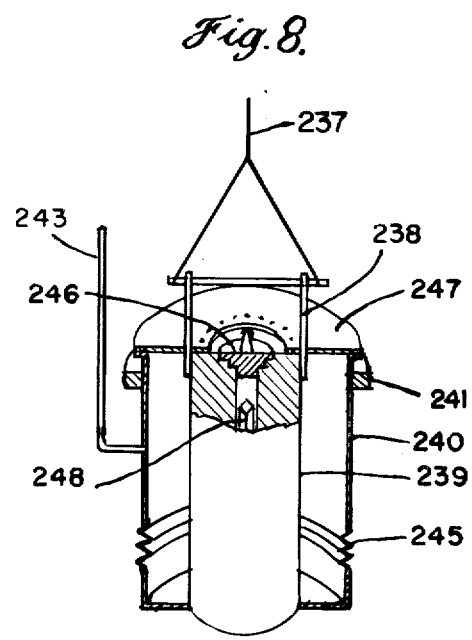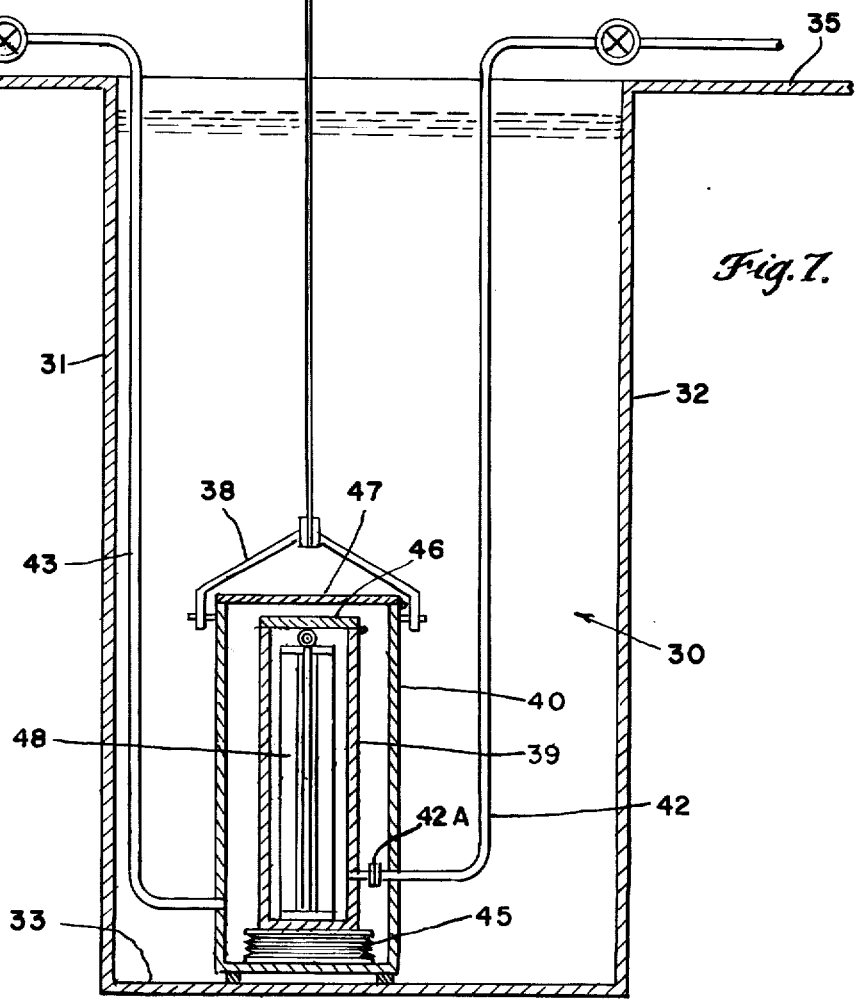

3,917,953

METHOD FOR DECREASING RADIATION HAZARD IN TRANSPORTING RADIOACTIVE MATERIAL

FIELD OF INVENTION

This invention relates to methods and/or apparatus for safeguarding biological systems from radiation from radioactive isotopes and particularly to the safeguarding of the exterior of shipping casks used for relatively long distance shipment of radioactive materials, conveniently called interplant transportation of a cask, beneath water.

PRIOR ART

Heretofore, the advantages of water as a radiation shield has been recognized in handling and storing radioisotopes. For example, tubes containing Cobalt-60 are employed for polymerizing organic monomer in polymerization zones which are submerged beneath a pool of water. Certain types of fuels reprocessing plants and nuclear reactors employ deep pools of water partly because the great depth of water serves as a useful shield protecting biological systems from radiological hazards. Such pools of water sometimes become significantly contaminated with radioactive isotopes. Nuclear fuel rods are scheduled for use in a nuclear reactor for only a controlled period of time because the fission process alters the concentration of the fissionable material. At a reprocessing plant, the desired fissionable material can be salvaged. Fuel rods suitable for continued operation of the nuclear reactor can be manufactured making use of such salvaged reprocessed fissionable material. The provision of methods for shipping exhausted nuclear fuel rods from a nuclear reactor to a fuel reprocessing plant have been developed by nuclear engineers for several decades and a great variety of proposals have been tested and/or proposed. A shipping cask weighing from about 25 to 100 tons is conventionally employed in transporting fuel rods from a reactor to a reprocessing plant. Certain protective skirts have been devised for fin-like portions of a shipping cask. An article by P. Blum, H. Baatz, and J. Mangusi concerned with "Practical Experience in Spent Fuel Shipping" (August, 1971) describes a method of flushing with fresh water to protect a portion of a shipping cask. Notwithstanding the seriousness of the radiological hazards of loading depleted fuel rods into a cask suitable for shipment to a reprocessing plant, no satisfactory apparatus and/or method for adequately safeguarding personnel at a reasonable cost has been developed by the hundreds of engineers who have dealt with this problem.

SUMMARY OF THE INVENTION

In accordance with the present invention, a vertically shiftable container is floated, partially submerged, with its top surface at the surface of a pool of water, there being at least a potential danger of radioactive contaminants in the pool because of its association with a radioactive installation (e.g., a plant for reprocessing fissionable fuel rods or a nuclear reactor). A stream of fresh water is supplied to the interior of the container so that the exiting stream of fresh water overflows into the pool, which has adequate overflow facilities for coping with such additions. Then a cask for radioactive articles (e.g., exhausted fuel rods) is at least partially immersed in the fresh water in the container, whereby the bottom and all of the side exterior surfaces of the shipping cask are submerged in the fresh water. An annular zone filled with overflowing fresh water is thus formed between the interior wall of the container and the exterior wall of the cask. A special sealing lid is temporarily attached to provide a leakproof seal with the top of the cask and when the cask is immersed in the fresh water, said special lid also provides a leakproof seal with the container, thereby sealing said annular chamber between the cask and container. The water pressure in such annular chamber and/or water flow rate through the annular chamber (e.g., after the lid is sealed on the cask but before the lid is sealed on the container) are so controlled that any leakage between the annular chamber of the container and the contaminated pool is by clean water leaking outward, thereby keeping the shipping cask exterior from contacting the pool of contaminated water. Such fresh water protection is maintained throughout the steps of lowering the cask and container beneath the pool surface, transferring radioactive articles to or from the interior of the shipping cask, returning the assembly of cask, lid, and container to above the pool surface, and the removal of the cask from the container. Of importance, the fresh water protects the entire side and bottom exterior surfaces of the shipping cask from contamination by pool water.

If desired, the fresh water protected shipping cask, together with the container may be lowered from the surface of the pool to a submerged zone such as the bottom of the pool and the radioactive isotope material may be transferred underwater to the interior of the shipping cask under conditions adapted to prevent the pool water from contaminating the exterior of the surface of the shipping cask. The lid can have an opening through which fuel rods or other radioactive material may be put into or taken from the interior of the cask while submerged in the pool, thereby permitting harmless mixing of the contaminated water inside the cask and contaminated pool water. The pressure of the fresh water and/or flow rate thereof is so controlled that the entire side and bottom exterior surfaces of the shipping cask are protected during the shifting of the container from its surface position to a submerged position, while submerged, and then from such submerged position back to a surface position in which the top of the container is above the top surface of the pool of water. After the lid is above the pool, the shipping cask is withdrawn from its protecting envelope of fresh water. Thus, the entire side and bottom exterior surfaces of the shipping cask are sufficiently free from radioactive contaminants that such surfaces can comply with standards applicable to exterior radioactive isotope contamination of shipping casks. Various authorities have published certain standards which shipping casks for radioactive materials are supposed to meet prior to being transported through populated areas. The prolonged scrubbing and cleaning of the exterior of the shipping cask to remove contaminants attributable to the pool water are avoided by using the present invention while achieving more reliable compliance with the safety standards than easily attained by prior art scrubbing practices.

Fresh water at a suitably high pressure and/or flow rate is employed for maintaining clean water in the annular zone between the exterior of the shipping cask and the interior of the transfer container. The complete exterior of the cask is submerged in clean water in an enclosed container.

In certain embodiments, the special lid has an opening permitting access to the principal storage cavity of the shipping flask whereby items may be put in or taken from such flask while the special lid is secured to the cask. Thus, the lid closes and seals the annular chamber, but not the flask cavity. The special lid is removed from the cask after completion of a loading cycle. A transportation lid is then secured to the flask for the period when the flask is on a truck or other interplant vehicle. Such transportation lid seals the contents of the cask, and thus differs from the open-topped special lid of the present invention. Some embodiments of the special lid of the present invention have openings such that the lid for the cask during immersion in the pool can be of the same type as the lid employed during interplant transportation. An adequately cleaned cask lid is substituted for the contaminated flask lid prior to transfer of the cask from the fresh water container to an interplant vehicle.

In other embodiments of the invention, power actuated lids for the flask and/or container permit protection of side and bottom surfaces of the cask by fresh water.

DESCRIPTION OF DRAWINGS

FIGS. 1–6 are schematic representations of process steps for creating a fresh water zone effective in protecting substantially all of the exterior of a shipping cask from radiological contamination by the water in a pool of water at a radioactive installation.

FIG. 7 is a schematic partially sectional view of used fuel rods in a shipping cask in a shiftable container submerged in a pool of water in a nuclear reactor.

FIG. 8 is a perspective schematic partially sectional view of a simplified embodiment of assembly of a cask in a container of pressurized clean water.

FIG. 9 is a schematic partially sectional view somewhat resembling FIG. 5 but larger to permit clarification of alternative embodiments of cask and container.

The invention is further clarified by reference to the description of exemplary embodiments of the invention.

DETAILED DESCRIPTION

The process of the invention is understandable by a consideration of a simplified embodiment in FIG. 8. A shipping flask 239 has thick walls suitable for protecting a populated environment from the effects of radiation from a bundle of fuel rods of a type used in a nuclear reactor. A cable 237 is adapted to move the heavy shipping cask 239 vertically, upwardly and downwardly, above and below the surface of a pool of contaminated water. FIG. 8 is a schematic showing of the assembly at the bottom of a pool. Cask lifting trunions, conveniently designated as a harness 238 permits the cask 239 to be suspended by cable 237.

When the assembly is at the bottom of the pool, a cask lid 246 is removed from the cask to permit the radioactive material 248 to be inserted and/or removed. That is, the loading of the cask 239 is modified while the cask is beneath the surface of the contaminated pool. When the cask 239 is prepared for inter-plant shipment, a clean cask lid 246 is employed in lieu of any contaminated cask lid employed beneath the surface of the contaminated pool. Under some conditions, the cask 239 might be lowered to the pool bottom and returned to above the pool without a lid 246, inasmuch as the interior of cask 239 is contaminated and is not subject to safety standards of carriers.

In FIG. 8, a submarine container 240 has a flotation collar 241 adapted to maintain container 240, while filled with fresh water, at a lever high enough that the flotation collar is not completely submerged and so that the upper lip of container 240 is well above the surface of the contaminated pool. An important feature of the simplified embodiment of FIG. 8 is a sealing lid 247 secured to the top of flask 239, the under, outer edge of which is adapted to seal against the upper lip of container 240.

There are minor variations in the height of approximately similar shipping casks 239. Container 240 is adapted to achieve an effective seal notwithstanding the use of casks 239 of different heights. An accordion zone 245 near the lower portion of container 240 permits the container to contract in the absence of a flask 239, and to expand sufficiently to accommodate a flask 239 within a reasonable range of heights. When the cable 237 lowers cask 239 into the fresh water filled container 240, some fresh water is initially displaced from container 240, spilling into the contaminated pool, and such overflow continues as the flask is lowered to the bottom of container 240, thereby expanding bellows 245. The outer periphery of sealing lid 247 seals against the upper lip of container 240 prior to the time that the contaminated water of the pool might have opportunity to backflow into the protective zone between the exterior sidewalls of cask 239 and the interior sidewalls of container 240.

A flexible hose 243 maintains a significant water pressure in such protective zone, but as the assembly is submerged to greater depths in the pool of water, the downward pressure of the weight of the cask 239 combines with the upward flotation pressure imparted by collar 241 so that an effective seal is maintained between the bottom of sealing lid 247 and the top lip of container 240. Even if such sealing were less than perfect, the presence of the water pressure attributable to flexible hose 243 would prevent any backflow of contaminated pool water through the seal into the protective zone between the exterior sidewalls of cask 239 and interior sidewalls of container 240.

By the use of the simplified embodiment of FIG. 8, a relatively inexpensive container 240 can be maintained at a location suitable for vertical travel within the pool of contaminated water. A shipping cask 239 can be loaded or unloaded under water with substantially no contamination to substantially all of the exterior surfaces of such shipping cask which surfaces are protected by the fresh, clean water supplied through flexible hose 243. The container 240 is readily submerged by the weight of the shipping flask. When filled merely with fresh water, the container 240 can float with the flotation collar only partially immersed.

In its simplest form, the modification of the loading merely requires the lowering of the cask 239 with its sealing lid 247 towards the bottom of the pool where the loading or unloading occurs, and the subsequent lifting of the cask 239 from the bottom of the pool to above the pool surface, all of the operation of the container 240 being a series of essentially automatic responses to the action of the flotation collar 241. Thus, the container 240 initially floats, is submerged by the downmoving flask 239, preserves the sealing of the protective zone, and readily releases the cask 239 when the cask is lifted from the clean water after the container 240 has risen to its flotation level. An advantage of the container 240 is its low capital cost, appropriate for apparatus employed non-continuously.

Such process of use of the simplified FIG. 8 apparatus can be summarized as in a method in which the loading of a nuclear material cask is modified at a submerged zone in a pool of water contaminated with radionuclide materials, the improvement which consists of: providing a submarine container having a fresh water supply line; placing the nuclear material cask in a sealed zone substantially submerged in fresh water in said container and substantially continuously supplying pressurized fresh water to provide within the protective zone between the interior sidewalls of the container and the exterior sidewalls of the cask water pressure greater than the water pressure in the pool of contaminated water, whereby any leakage between such protective zone and the pool is from the fresh water in the protective zone to the contaminated pool water; moving the combination of container, water pressure supply line, and nuclear material cask between a surface station and a submerged location in said contaminated pool; transferring items to or from the nuclear material cask to modify the loading thereof while the cask is submerged while preserving the exterior sidewalls of said cask protected by fresh water; transferring the thus modified combination of container, pressurized water, and nuclear material cask from a submerged location to a surface station; removing the nuclear material cask from the container at the surface station, the exterior sidewalls of the cask having minimized deposits from the contaminated pool water because of the continuous fresh water pressure contacting all of the principal outside surfaces of the cask durings its placement, transportation, and removal from said container.

FIGS. 1 to 6 show schematically a method in which a nuclear fuel bundle 48 is transferred to a shipping cask 39 while both are submerged within a pool of water 30. FIG. 9 further illustrates the step shown in FIG. 5. The present invention features maintenance of fresh water (sometimes called clean water) around substantially all of the exterior surfaces of the shipping cask 39. The exterior portions of the shipping cask 39 are not contaminated by the radioactive components in the water of the pool 30 because protected by the fresh water. Such pool water can be conveniently designated as contaminated water for distinguishing it from the fresh water. The cask 39 is placed in a container 40 and the assembly of the cask and container are vertically shifted between positions near the surface and near the bottom of the pool water 30. As shown in FIG. 1, the pool 30 of contaminated water can be within a vat having sidewalls 31, 32, and a bottom 33. Various controls for valves and related mechanisms can be accessible near a primary working area 34 and/or a secondary working area 35 at the edges of the vat containing the pool 30 of contaminated water.

An overhead crane 36 can control a cable 37 having a harness 38 adapted to engage with objects to be transported. As shown in FIG. 1, the harness 38 supports the shipping cask 39, which is lowered into a container 40 having a buoyancy collar 41 to support the upper portion of the floating cask near the surface of the pool 30. The weight and/or average density of the flask 39 are ordinarily significantly greater than the weight and/or average density of the container 40 so that the buoyancy collar 41, the adequate for the water filled container 40, does not jeopardize the submerging of the assembly of flask 39 and container 41. If desired, buoyance collar 41 can be of the inflatable-deflatable type comprising means, not shown, for remote control of the inflation and deflation programming.

The programming of equipment in zones subjected to radiation hazards from radioactive materials, using remote control means, is sufficiently well established that in a schematic drawing, the identification of programming control means 54 adequately clarifies the use of remote control means for the various power-actuated systems. The container 40 is adapted to accommodate articles of different heights, there being a platform supported by an accordian jack 45, the height of which is remotely controlled by said programming control means. A series of communication lines, not shown, permit the operator to program the necessary steps of the overall process through operation of the programming control means 54, and the schematic showing of the accordian jack 45 and/or the said inflatable-deflatable collar 41 represents adequate schematic showing of such remote control systems for programming the actuatable portions of the apparatus.

As shown in FIG. 2, the shipping cask 39 can rest on the platform of the accordian jack 45 within the container 40. The shipping cask 39 is reused many times, whereby the interior surface becomes significantly contaminated with radioactive isotopes. There are no health standards to be met regarding the interior surface of the shipping cask. An effort is made to prevent any of the rinsable radioisotopes on the inside of the shipping cask 39 from contaminating the exterior surface of said shipping cask. A remotely controllable power actuated lid 46 of the shipping cask 39 can be opened or closed to meet the needs of the process. Similarly, the container 40 is provided with a remotely controllable power actuated lid 47.

The present invention is concerned primarily with the preservation of the cleanliness of the external surface of the shipping cask 39 by the protective influence of clean water, whereby the entire external sidewall surface of the shipping cask 39 is protected from contamination by the pool water 30. A hose 43 supplies fresh clean water to the annular zone between the interior of the container and exterior of the cask. As long as the clean water protection is maintained under nearly static conditions, any seepage through the seal is from the clean water into the pool because of maintenance of a relatively higher pressure for the clean water. Whenever the seal is not functioning, clean water protection is achieved by fresh water flow rates adequate to constantly flush such exterior surface of the flask to maintain its cleanliness.

In some of the relatively complicated embodiments, the external surface is also endangered by the possibility of contamination from water flowing from the inside of the shipping cask 39, inasmuch as fresh water, flowing along the contaminated internal surface of the shipping cask 39 can become troublesomely contaminated. The flushing of the inside of the cask is not for the purpose of achieving perfect cleanliness, but rather for the purpose of preventing the contamination of the exterior surface by the contaminants dissolved in any flushing water contacting the inside of the shipping flask 39.

The shipping container 39 can be provided with a power actuated remotely controllable coupling 42A adapted to engage with the corresponding portion of fresh water hose 42, as shown in FIGS. 2 and 7. The effectiveness of the internal flushing through the hose 42 can be evaluated while the top of the cask is near the upper surface, the relative flushing rates for hoses 43 and 42 being so controlled that there is little propensity for the effluent from the interior of the shipping container to flow onto the outside of such container.

In the embodiment shown in FIGS. 1–6, the cask 39 can be placed in the clean water of container 40 and the harness 38 transferred so that the harness 38 supports the assembly of the cask 39 and container 40. Thereafter the lids 46 and 47 are closed and the exterior of the cask 39 is protected by the static water pressure instead of by flushing. The container 40 and contents can be lowered from the surface of the pool to the bottom thereof as symbolized in FIG. 3. Upon the opening of lids 46 and 47, (FIG. 4), the water flow rates through hoses 42 and 43 are so controlled as to assure the cleanliness of the exterior of the shipping cask 39. The harness 38 can be transferred from container 40 to a fuel bundle 48.

As shown in FIG. 4, a fuel bundle 48 from a nuclear reactor can be carried by harness 38 and cable 37 from the nuclear reactor through the water to the shipping cask 39, and lowered into the shipping cask, after which the harness 38 is transferred to container 40. As shown in FIG. 5, the lid 46 of the shipping cask 39 can be closed and the lid 47 of the container 40 can be closed. The closed unit can then be lifted by the crane 36 to the surface where the cask 39 is lifted from the container 40 which floats near the surface of the pool. The cask 39 is ready for transfer to a truck or other transportation means scheduled to carry it to a reprocessing plant. The suspension of the ready to ship cask 39 is shown schematically in FIG. 6. According to most prior art practices, the entire exterior surface of a cask would have required scrubbing after removal from the pool but before shipment by truck, but no such complete scrubbing is required by the present invention because the clean water protects the exterior surfaces of the cask 39 from the contaminated water.

FIG. 7 resembles FIG. 5, but shows some of the apparatus in greater detail. A bundle of fuel rods 48 is in the shipping cask 39, which rests upon a platform of an accordian jack 45 in the container 40. A hose 43 supplies clean water to the annular zone between the interior of the container 40 and the exterior sidewalls of the shipping cask 39. After the lids are closed, the water hose merely provides water pressure tending to promote any seepage outwardly rather than tolerating any permeation of the pool liquid into the container 40.

The embodiment shown in FIG. 9 resembles the simplified assembly of FIG. 8. A cylindrical shipping cask 339 is temporarily protected by cylindrical container 340. A buoyancy collar 341 maintains the water-filled container at the surface of the pool. An accordian expansion zone 345 of the container 340 can permit the cask to accommodate shipping casks 339 of various heights. A sealing lid 347 serves as a cover for the annular zone between the cask and container. A removable lid for the inner cask 339 can be removed prior to loading or unlaoding of the cask and repositioned on the cask following the loading or unloading. If desired, the seal 347 may include a check valve opening 351, whereby water injected through hose 343 at a pressure exceeding a predetermined limit can be discharged into pool 330. If desired, the seal 347 may include a resilient closure 352 through which radioactive material (e.g., a fuel rod) can be transferred to or from the shipping cask 339. All of the principal exterior cylindrical walls of the shipping cask 339 are maintained in a clean condition because the pressurized fresh water prevents seepage of pool water into the annular zone. The cask 339 can automatically separate from floating container 340 when floatation ring 341 and associated assembly are lifted to the pools surface. The cask 339 and contents can be transferred to a work area such as 335 prior to final preparations for interplant shipment.

In the method of the present invention, the fresh water is supplied at an effective pressure to the zones which might constitute the principal exterior surfaces of a shipping cask, whereby the principal external surfaces of the shipping cask are adequately protected from contamination by the water in the pool. The outer surface of the thus removed shipping container is sufficiently free from radioactive contamination that it may pass the standard tests for qualifying for shipment. Thus, the need for the thorough scrubbing of the exterior, and the uncertainties affecting the sufficiency of the scrubbing are eliminated.

Various modifications of the invention are possible without departing from the scope of the appended claims.

I claim:

1. In a method in which the loading of a nuclear material cask is modified at a submerged zone in a pool of water contaminated with radionuclide materials, the improvement which consists of:

providing a submarine container having a fresh water supply line;

placing the nuclear material cask in a sealed zone substantially submerged in fresh water in said container and substantially continuously supplying pressurized fresh water to provide within the protective zone between the interior sidewalls of the container and the exterior sidewalls of the cask water pressure greater than the water pressure in the pool of contaminated water, whereby any leakage between such protective zone and the pool is from the fresh water in the protective zone to the contaminated pool water;

moving the combination of container, water pressure supply line, and nuclear material cask between a surface station and a submerged location in said contaminated pool;

transferring items to or from the nuclear material cask to modify the loading thereof while the cask is submerged while preserving the exterior sidewalls of said cask protected by fresh water;

transferring the thus modified combination of container, pressurized water, and nuclear material cask from a submerged location to a surface station;

removing the nuclear material cask from the container at the surface station, the exterior sidewalls of the cask having minimized deposits from the contaminated pool water because of the continuous fresh water pressure contacting all of the principal outside surfaces of the cask during its placement, transportation, and removal from said container.

2. Apparatus useful in modifying the loading of a nuclear material cask in a submerged zone in a pool of water contaminated with radionuclide materials, said apparatus including the combination of:

an open topped container having a cavity adapted to receive a nuclear material cask, such nuclear material cask being adapted for transportation through populated areas, there being a peripheral zone between the outer vertical side walls of the nuclear material cask and the inner vertical side walls of the container;

sealing means adapted to seal the top of the peripheral zone;

flexible conduit means adapted to supply fresh water to said peripheral zone at a pressure greater than the pressure encountered at the submerged zone at which the loading is modified; and means controlling the vertical movement of the combination of the container, seal, nuclear material cask, pressurized fresh water, and flexible conduit between a surface station and a submerged zone in a pool of water contaminated with radionuclide materials, whereby any leakage is between the peripheral zone to the pool without any leakage from the contaminated pool to the peripheral zone.

3. The container as defined in claim 2 comprising flexible accordian-like means adapted to accommodate the fresh water protection of nuclear material casks of different heights.

4. The container as defined in claim 2 comprising floatation means adapted to maintain the top edge of the container above the surface of the pool when the container is filled with fresh water.

5. Apparatus as defined in claim 4 comprising a sealing lid secured to the nuclear material cask and adapted, upon the immersion of the cask in the water of the container, to provide the sealing means sealing the top of the peripheral zone and to automatically unseal such zone upon the lifting of the cask from the container at its surface station.

6. The container as defined in claim 2 comprising means directing the flow of flushing water from the peripheral zone into the pool of contaminated water.

7. The container as defined in claim 2 in which the nuclear material cask has a remotely controlled power actuated lid.

8. The cask of claim 2 in which the container has a remotely controlled power actuated lid.

9. The cask of claim 2 in which fresh water conduit means assures controlled flushing of the interior of the nuclear material cask.

* * * * *